United States Patent [19]

Högberg

[11] Patent Number: 4,690,301

[45] Date of Patent: Sep. 1, 1987

[54] APPARATUS FOR INDIVIDUALLY DEPOSITING ARTICLES

[75] Inventor: Leif Högberg, Solklintvej, Denmark

[73] Assignee: Jydsk Teknologisk Institut, Arhus, Denmark

[21] Appl. No.: 826,774

[22] Filed: Feb. 6, 1986

[30] Foreign Application Priority Data

Feb. 22, 1985 [DK] Denmark ................................ 830/85

[51] Int. Cl.$^4$ ............................................... A01C 7/04
[52] U.S. Cl. ........................................... 221/2; 221/6; 221/13; 221/93; 221/116; 221/124; 221/133; 221/211; 221/277
[58] Field of Search ............... 221/211, 237, 133, 277, 221/2, 6, 13, 124, 117, 114, 116, 112, 123, 93, 21, 9

[56] References Cited

U.S. PATENT DOCUMENTS

| | | | |
|---|---|---|---|
| 1,680,024 | 8/1928 | Koerner | 221/123 X |
| 2,054,319 | 9/1936 | Hanson | 221/13 X |
| 2,054,320 | 9/1936 | Hanson | 221/211 X |
| 2,152,758 | 4/1939 | Cox | 221/13 X |
| 2,183,606 | 12/1939 | Day | 221/211 X |
| 3,206,062 | 9/1965 | Rappaport | 221/211 X |
| 3,331,532 | 7/1967 | Hori | 47/56 X |
| 3,387,746 | 6/1968 | Whipple | 221/211 |
| 3,445,981 | 5/1969 | Hori | 47/56 X |
| 3,770,164 | 11/1973 | Hembree | 221/211 |
| 3,997,063 | 12/1976 | Adams et al. | 221/2 X |
| 4,042,114 | 8/1977 | Arlid et al. | 221/277 X |
| 4,094,439 | 6/1978 | List | 221/9 |
| 4,333,096 | 6/1982 | Jenkins et al. | 221/21 X |
| 4,519,525 | 5/1985 | Wunschl | 221/211 |

FOREIGN PATENT DOCUMENTS

| | | | |
|---|---|---|---|
| 237950 | 1/1965 | Austria | 221/21 |
| 497881 | 4/1930 | Fed. Rep. of Germany | 221/21 |
| 940641 | 12/1948 | France | 221/21 |
| 988160 | 8/1951 | France | 221/21 |

Primary Examiner—Robert J. Spar
Assistant Examiner—P. McCoy Smith
Attorney, Agent, or Firm—Watson, Cole, Grindle & Watson

[57] ABSTRACT

An apparatus for individually depositing articles comprises a cylinder with a plurality of accommodating apertures, each of which is adapted to accommodate a single article only from a supply. The apparatus is adapted to retain the articles in the apertures and comprises nozzles for removing superfluous articles from the cylinder. Moreover, the apparatus is adapted to release the articles from the apertures. In order to secure that the articles are deposited one by one without any interruptions in the depositing pattern, the apparatus comprises a supplementary cylinder having accommodating apertures corresponding to the accommodating apertures of the cylinder. Also each of the accommodating apertures of the supplementary cylinder is adapted to accommodate a single article only from a supply, the supplementary cylinder also comprises nozzles for removing superfluous articles and is also adapted to retain the articles in the accommodating apertures. Also the supplementary cylinder can release articles from the accommodating apertures. The apparatus has a detector for detecting empty accommodating apertures in the cylinder, and the supplementary cylinder is provided with a stripper which is coupled to the detector in such a way that the stripper removes articles from the supplementary cylinder when articles are present in the corresponding accommodating apertures in the cylinder, whereas the stripper, if this is not the case, permits articles on the supplementary cylinder to pass in such a way that such articles may be deposited instead of the articles lacking in the accommodating apertures of the cylinder.

3 Claims, 1 Drawing Figure

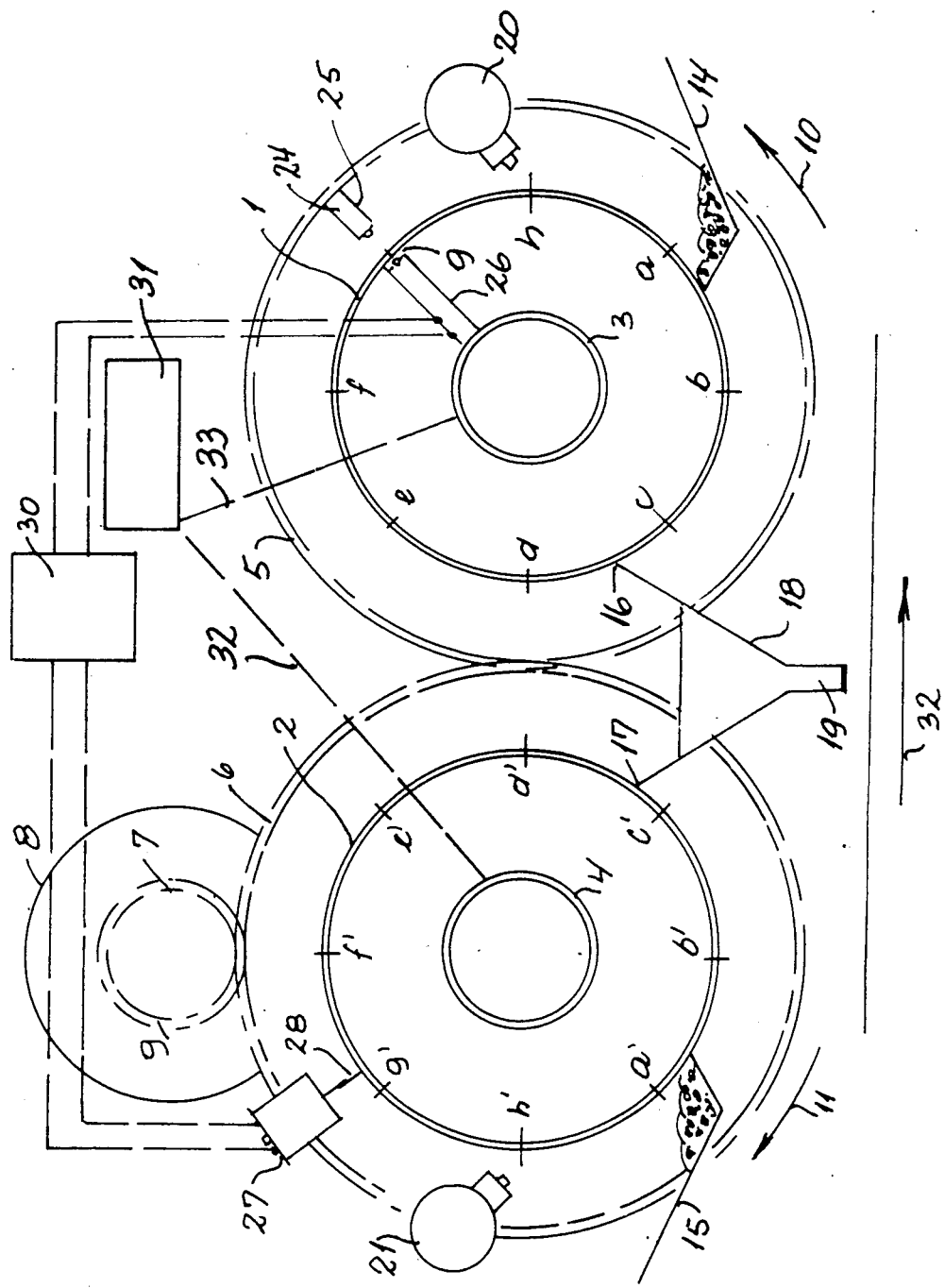

APPARATUS FOR INDIVIDUALLY DEPOSITING ARTICLES

BACKGROUND OF THE INVENTION

The present invention relates to an apparatus for individually depositing articles and of the kind comprising a cylinder having a plurality of accommodating positions, each of which is adapted for accommodating a single one of the articles concerned from a supply thereof, said cylinder being provided with means for retaining the articles at the accommodating positions, means for removing superfluous articles from the cylinder and means for releasing the articles from the accommodating positions.

According to the previously known apparatuses of the kind referred to above it is intended to accommodate one and only one article at each of the accommodating positions of the cylinder. It is intended to achieve this effect by removing superfluous articles from the cylinder. However, in order to secure that superfluous articles really are removed from the cylinder it is impossible to avoid that also articles unintentionally are removed from accommodating positions of the cylinder at which only one article already is positioned. In such cases the result will be that voids occur in the pattern intended to be formed by depositing the articles concerned.

It is the object of the present invention to provide an apparatus of the kind referred to above, wherein the risk that voids occur in the pattern intended to be formed by the depositing of the articles is reduced, and it is also intended by means of the invention to secure that only a single article is deposited from each accommodating position.

SUMMARY OF THE INVENTION

According to the present invention this object is achieved by the apparatus comprising a supplementary cylinder having accommodating positions corresponding to the accommodating positions of a first cylinder, each of the accomodating positions of the supplementary cylinder being adapted to accommodate a single one of the articles concerned from a supply thereof, the supplementary cylinder, moreover, being provided with means for removing superfluous articles from the supplementary cylinder, means for retaining articles at the accommodating positions and means for releasing the articles from the accommodating positions, the apparatus, moreover, comprising means for detecting empty accommodating positions on the first cylinder, the supplementary cylinder being provided with means connected with the detecting means and adapted to occupy two condition, viz. a first condition in which said means remove articles from the corresponding accommodating positions of the supplementary cylinder, and a second condition in which said means allow articles positioned at corresponding accommodating positions on the supplementary cylinder to pass said means, said detecting means being connected with said last mentioned means in such a way that said last mentioned means are shiftable from the first to the second condition by activation from the detecting means. It is thus achieved that articles will be deposited from the supplementary cylinder in cases where no articles will be deposited from the first mentioned cylinder, and such supplementary depositing will fill the voids which would otherwise result, and accordingly, it is to a high degree assured that the articles in question are deposited according to the pattern intended without voids.

Further features of the invention will be apparent from the following detailed description.

BRIEF DESCRIPTION OF THE DRAWING

The drawing illustrates a preferred embodiment of the apparatus according to the invention, shown schematically and viewed from one end.

DESCRIPTION OF THE PREFERRED EMBODIMENT.

The apparatus illustrated comprises two cylinders 1 and 2, each of which is rotatable about a stationary tube 3 and 4, respectively. At one end each of the cylinders is provided with a gear wheel 5 and 6, respectively, which engage with each other and, moreover, the gear wheel 6 engages with a pinion 7 driven from a motor 8 via a gear 9. Thereby the cylinder 1 is driven in the direction of the arrow 10 and the cylinder 2 in the direction of the arrow 11.

In each cylinder longitudinally extending rows of apertures are provided, viz. in the case illustrated eight rows of apertures in each cylinder. The rows of apertures are as regards the cylinder 1 designated a, b . . . h, and are as regards the cylinder 2 provided with the same reference letters supplemented by a "'". The number of apertures in the longitudinally extending rows of apertures is equal and the apertures are arranged along imaginary equally spaced circles extending around the cylinders 1 and 2. The apertures serve as accommodating positions.

Each cylinder is provided with a trough 14 and 15, respectively, for accommodating a supply of the articles to be deposited by the apparatus. The troughs are positioned at the bottom to the right and at the bottom to the left, respectively, as regards the two cylinders 1 and 2.

Furthermore, the apparatus comprises means for releasing articles from the two cylinders, viz. in the form of scraping edges 16 and 17, respectively, which constitute the top edges of a collecting box 18 having generally V-shaped cross section, and which at the bottom is provided with a row of pipe stubs 19, the number of which corresponds to the number of circumferentially extending rows of apertures of each of the cylinders 1 and 2. Each cylinder is provided with means for removing superfluous articles, viz. in the form of a set of pressure air nozzles 20 and 21, respectively. Each set of nozzles comprises a number of nozzles corresponding to the number of circumferentially extending rows of apertures in the corresponding cylinder, and one nozzle is arranged opposite each such circumferentially extending row.

Moreover, the cylinder 1 is provided with a row of sets of detecting means 24. One such set is positioned opposite each circumferentially extending row of apertures, and each set comprises a light emitter 25 arranged outside the cylinder and a corresponding light diode 26 which is arranged within the cylinder concerned.

The cylinder 2, moreover, is provided with a set of stripping means 27, viz. in the form of a row of solenoids, the number of which corresponds to the number of circumferentially extending rows of apertures in the cylinder, and one such solenoid is arranged opposite each circumferentially extending row of apertures in the cylinder. Each solenoid carries a stripper 28 and each solenoid 27 is coupled to a corresponding light diode 26 by means of an electric coupling, schematically indicated at 30.

The apparatus shown is also provided with a vacuum source schematically indicated at 31 which via suction lines 32,33 is connected with the interior of each of the cylinders 1 and 2 via the two tubes 3 and 4.

As mentioned above the apparatus is illustrated schematically, but it will be understood that the parts previously explained are supported by a frame which for the sake of clarity has been omitted from the drawing.

The apparatus illustrated operates in the following way:

When a row of accommodating positions or apertures a . . . h by rotating the cylinder 1 in the direction of the arrow 10 passes the trough 14, the apertures of the row of apertures concerned will pick-up articles. In order to secure that only one article is picked up at each aperture, the apertures of the row of apertures concerned are heavily blown by means of compressed air when the row of apertures passes the pressure air nozzles 20. However, in order to secure that superfluous articles really are removed by means of the pressure air nozzles 20 it has been ascertained to be impossible to avoid that also some articles unintentionally are removed from apertures at which only one article has been retained. Accordingly, a great risk exists that some of the accommodating positions or apertures are empty after having passed the pressure air nozzles 20. When such empty aperture passes the detecting means 24 the corresponding set of detecting means 25,26 will issue a pulse via the coupling 30 to the corresponding solenoid 27 with a corresponding stripper 28. Thereby such stripper 28 will be lifted clear of the cylinder 2, whereby an article at the corresponding accomodating position will pass the solenoid 27 concerned. The fact is that the other cylinder 2 acts as a supplementary cylinder. When a row of apertures in the cylinder 2 passes the corresponding trough 15, preferably only one article will be picked up at each accommodating position or at each aperture. In case two or more articles should be picked up at each accommodating position, superfluous articles will be blown away and fall back into the trough 15 when the row of apertures concerned passes the pressure air nozzles 21. However, by such blowing operation it may happen that also in this case an article is removed from a position at which only one article has been positioned, but the risk that an article should be missing in two corresponding accommodating positions on the two cylinders 1 and 2 is extremely small.

When a row of apertures passes the strippers 28 the strippers normally will strip and remove the articles positioned at the apertures concerned in such a way that such articles fall back into the trough 15. However, if an article is lacking at an accomodating position on the cylinder 1, the detecting means 25, 26 corresponding to the position concerned will via the coupling 30 activate the corresponding solenoid 27 in such a way that such solenoid is shifted from a condition wherein the corresponding stripper removes the corresponding article from the cylinder 2 and to a state in which the stripper concerned is lifted in such a way that the article concerned is allowed to pass. Accordingly, the result will be that when an empty aperture in the cylinder 1 arrives at the scraping edge 16, a corresponding aperture with an article secured thereto will arrive at the opposite scraping edge 17, and accordingly the result will be that lacking articles on the cylinder 1 will be compensated for by means of the cylinder 2.

The result, accordingly, will be that the depositing pattern aimed at really will be deposited through the pipe stubs 19, i.e. rows of articles without voids.

According to the embodiment illustrated on the drawing apertures in the cylinders 1 and 2 are used as accommodating positions, but it will be understood that also other sorts of accommodating positions may be used. For instance also small magnets may be used instead of the apertures, viz. in cases where the articles to be deposited are magnetizable. In the latter instance means may be used for releasing the articles concerned in the form of scraping edges 16 and 17 as shown on the drawing, but it will also be possible instead to use electromagnets at the accommodating positions and to demagnetize such magnets at the positions where depositing is intended.

Furthermore, it should be noticed that an embodiment is illustrated on the drawing wherein cylinders 1 and 2 are used the whole interior of which is subjected to low pressure.

However, it will be understood that instead of cylinders where the whole inner surface of the circumference is subjected to low pressure also cylinders may be used wherein low pressure is applied only along the portions of the cylinder surfaces where the retaining of articles is to be carried out. Such embodiment may be achieved by arranging radially extending partitions in each of the cylinders 1 and 2, viz. generally corresponding to the positions b-d; b'-d', respectively. In such an embodiment high pressure may be used in the chambers defined by the partitions mentioned in the cylinders 1 and 2 in order to arrange for the release of the articles concerned.

The embodiment of the apparatus illustrated on the drawing is intended to be used for depositing seeds in small flowerpots, which in this instance are moved below the pipe stubs 19 in rows in the direction of the arrow 32, viz. in such a way that each row comprises a number of flowerpots corresponding to the number of apertures in each row of apertures in each of the cylinders 1 and 2.

However, the apparatus may also be used for depositing seeds upon bands or sheets of different substrates, provided with spots of adhesive corresponding to the pattern according to which the articles are deposited. Moreover, it will be understood that the size of the apertures may vary, and the same applies as regards the suction force and if the articles are released by means of high pressure, also such pressure may vary, all adjusted according to the nature, weight and so on of the articles concerned.

I claim:

1. An apparatus for individually depositing seeds according to a predetermined pattern, comprising:
a rotatably mounted first hollow cylinder having apertures arranged in longitudinally extending rows, the number of said apertures in each row being equal, and said apertures being arranged in mutually spaced rows extending circumferentialy around said first cylinder;
a rotatably mounted supplementary hollow cylinder having apertures arranged in longitudinally extending rows, the number of said rows being equal to the number of longitudinally extending rows of apertures in said first cylinder, the number of apertures in each longitudinally extending row of apertures in said supplementary cylinder being equal to the number of apertures in each of said longitudinally extending rows of apertures in said first cylinder, and the apertures in said supplementary cylinder being arranged in rows extending circumferentially around said supplementary cylinder, said circumferentially extending rows of apertures in said supplementary cylinder being spaced equal to the spacing of the circumferentially extending rows of apertures in said first cylinder;

said cylinders having at an end thereof mutually engaging gear wheels;

a motor having a drive pinion engaging one of said gear wheels for rotating said cylinders in mutually opposite directions;

a vacuum source connected with the interior of each of said cylinders;

a first trough for a supply of seeds to be deposited, said first trough being arranged along said first cylinder for supplying seeds to the apertures in said first cylinder;

a first set of air blowing nozzles arranged along said first cylinder and directed toward said circumferentially extending rows of apertures in said first cylinder, said first set of nozzles being spaced from said first trough in the direction of rotation of said first cylinder;

a row of sets of detecting means arranged along said first cylinder, each set of said detecting means being positioned opposite a corresponding circumferentially extending row of apertures in said first cylinder, each set of detecting means comprising a light emitter and a corresponding light diode respectively located externally to and internally of said first cylinder, said row of detecting means being spaced from said first set of air nozzles in the direction of rotation of said first cylinder;

a second trought to a supply of seeds to be deposited, said second trough being arranged along said supplementary cylinder for supplying seeds to the apertures in said supplementary cylinder;

a second set of air blowing nozzles arranged along said supplementary cylinder and directed toward said circumferentially extending rows of apertures in said supplementary cylinder, said second set of nozzles being spaced from said second trough in the direction of rotation of said supplementary cylinder;

a row of stripping means arranged along said supplementary cylinder and spaced from said second set of air blowing nozzles in the direction of rotation of said supplementary cylinder, said row of stripping means comprising a plurality of solenoids respectively arranged opposite a corresponding circumferentially extending row of apertures in said supplementary cylinder, said stripping means further comprising strippers respectively carried by said solenoids, said strippers, in a de-energized condiiton of the corresponding solenoids, contacting said supplementary cylinder for removing seeds positioned in the apertures in said supplementary cylinder, said strippers, in an energized condition of the corresponding solenoids, being out of contact with said supplementary cylinder for allowing seeds accommodated in said apertures in said supplementary cylinder to pass said strippers;

an electric coupling connecting each of said solenoids with the corresponding light diode and arranged for energizing, when receiving a pulse from the light diode, the solenoid connected with said light diode; and an upright collecting box arranged along said cylinders and having a row of depositing pipe stubs corresponding to the number of said apertures in each said row, said collecting box having two scraping edges at the top thereof contacting said cylinder for releasing the seeds from said apertures during rotation.

2. An apparatus for individually depositing seeds according to a predetermined pattern comprising:

rotatably mounted, side-by-side, first and supplementary hollow cylinders having intermeshed gears for effecting rotation of said cylinders in mutually opposite directions;

drive means engaging one of said gears for the rotation of said cylinders;

each of said cylinders having longitudinally extending rows of apertures of equal number in each of said rows, said rows in said cylinders, respectively, being equally spaced apart circumferentially and said rows of one of said cylinders corresponding to said rows of the other of said cylinders;

troughs respectively associated with said cylinders for supplying seeds to said apertures in said cylinders during the rotation;

sets of blowing nozzles respectively directed toward one of said rows of said cylinders for blowing all but one seed from said apertures of said rows, in succession during the rotation, said sets being respectively spaced from said troughs at locations in the directions of the rotation;

means for detecting the presence and absence of a seed in any of said apertures of said rows in said first cylinder, said detecting means being spaced from said first cylinder set of nozzles at a location in the direction of the rotation;

stripping means including strippers for normally carrying out a removal of each of the seeds from said apertures in each of said rows, in succession, in said supplementary cylinder upon the rotation thereof, said stripping means being spaced from said supplementary cylinder set of nozzles at a location in the direction of the rotation, said stripping means and said detecting means being in registry relative to said cylinders;

means coupling said detecting means with said stripping means for lifting said strippers relative to said supplementary cylinder to cese the removal of seeds from said apertures in response to any absence of seeds from said apertures of said first cylinder as detected by said detecting means; and an upright collecting box associated with both said cylinders and having a row of depositing pipe stubs corresponding to the number of said apertures in each said row, said box having a pair of scraping edges at the top thereof respectively contacting said cylinders for releasing the seeds from said apertures during the rotation;

whereby seeds are deposited in said collecting box from said apertures of said first cylinder during the rotation thereof, and only in the event of any absence of seeds from any of said apertures of said first cylinder, seeds are deposited in said box from said apertures of said supplementary cylinder, during the rotation thereof, corresponding to the empty apertures of said first cylinder.

3. The apparatus according to claim 2, wherein said detecting means comprise a row of sets of light emitters and corresponding light diodes respectively located externally to and internally of said first cylinder, said stripping means comprising a row of solenoids carrying said strippers, such that in a deenergized condition of said solenoids said strippers contact said supplementary cylinder for removing the seeds from said apertures thereof, and in an energized condition of said solenoids said strippers are out of contact with said supplementary cylinder for ceasing the removal of seeds from the apertures thereof, and said coupling means comprises an electrical coupling respectively connecting said solenoids with said light diodes and for energizing said solenoids when receiving a pulse from said light diodes.

* * * * *